United States Patent [19]

Lindblom et al.

[11] Patent Number: 5,200,687
[45] Date of Patent: Apr. 6, 1993

[54] ENERGY STORAGE SYSTEM FOR BOTH CHARGING AND DISCHARGING

[75] Inventors: Jonas Lindblom; Erik Johnsson, both of Upplands Vasby, Sweden

[73] Assignee: Victor Technologies AB, Sweden

[21] Appl. No.: 693,659

[22] Filed: Apr. 30, 1991

[51] Int. Cl.$^5$ ............................................. H01M 10/04
[52] U.S. Cl. .......................................... 320/2; 429/100
[58] Field of Search ........................ 320/2; 429/99, 100, 429/163

[56] References Cited

U.S. PATENT DOCUMENTS

| | | | |
|---|---|---|---|
| 3,668,528 | 6/1972 | Hutchinson et al. | 429/163 X |
| 4,147,838 | 4/1979 | Leffingwell | 320/2 |
| 4,382,219 | 5/1983 | Heine et al. | 320/2 |
| 4,389,469 | 6/1983 | Nicholls | 429/100 |
| 4,602,202 | 7/1986 | Mundschenk et al. | 320/2 |
| 4,628,243 | 12/1986 | Hodgman et al. | 320/2 |
| 4,645,996 | 2/1987 | Toops | 320/2 |
| 4,751,452 | 6/1988 | Kilmer et al. | 320/2 |

Primary Examiner—William H. Beha, Jr.
Assistant Examiner—Kristine Peckman
Attorney, Agent, or Firm—Warren B. Kice; David L. McCombs; Frederick W. Padden

[57] ABSTRACT

An energy storage system for use in a receptacle having terminals connected to conductors for establishing an electric circuit. The energy storage system includes one or more batteries disposed in an abutting relationship and connected together by a metal clip. A tab extends from the clip for engaging an external power source and another tab extends from the clip to a terminal of one of the batteries to supply a charging current to the batteries.

10 Claims, 1 Drawing Sheet

ENERGY STORAGE SYSTEM FOR BOTH CHARGING AND DISCHARGING

BACKGROUND OF THE INVENTION

This invention relates to an energy storage system, and, more particularly, to such a system for receiving and storing electrical power and releasing the power to an electric circuit.

A multitude of energy storage systems are now on the market. Most include one or more alkaline batteries which are placed in an electrical device to power same. When the battery discharges all of its stored power, it is discarded and a new battery installed.

According to more modern techniques, devices are powered in the above manner, but use batteries which can be charged by a charging current. Thus when discharged, the batteries can be recharged by placing them in a dedicated charging device for charging, and then returning them to the device to be powered. These chargeable batteries are of a special design, usually involving nickel cadmium, and are marketed in multiples, which are referred to as "battery packs". Still other techniques utilize chargeable batteries of the above type that are placed in the device to be powered and, when discharged, the device can be connected to an external source of power when not in use to charge the batteries.

Problems arise when alkaline batteries are used in applications that are designed for chargeable batteries, i.e., circuits which are adopted to apply a charging current to the batteries. More particularly, when alkaline batteries are placed in these types of circuits, and a charging current is applied thereto, the batteries, and therefore portions of the circuit, can be damaged. Moreover, these type of batteries can explode, thus creating a hazard.

SUMMARY OF THE INVENTION

It is therefore an object of the present invention to provide a system for insertion into an electrical circuit for providing electrical power to the circuit.

It is a further object of the present invention to provide an energy storing system of the above type utilizing batteries which can be easily inserted into, and removed from, the device to be powered and which can receive a charging current from the device.

It is a further object of the present invention to provide a system of the above type which is designed so that alkaline batteries cannot be inadvertently used.

Toward the fulfillment of these and other objects, the energy storing system of the present invention is designed for use in a receptacle having terminals connected to conductor means for establishing a electric circuit. The energy storage system is in the form of one or more chargeable batteries and a specially designed metal clip extending over the batteries to form a "battery pack" which is designed to be quick-detachably inserted into the receptacle in engagement with the terminals of the receptacle. The metal clip includes a tab which is adapted to engage a power source in the device to be powered, and an additional tab adapted to engage a battery terminal so that a charging current can be applied to the batteries. Thus, since the metal clip is necessary to receive the charging current, if alkaline batteries are placed in the receptacle they would not receive the charging current, thus avoiding any potential damage.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing wherein.

DESCRIPTION OF THE PREFERRED EMBODIMENT

Figure 1:
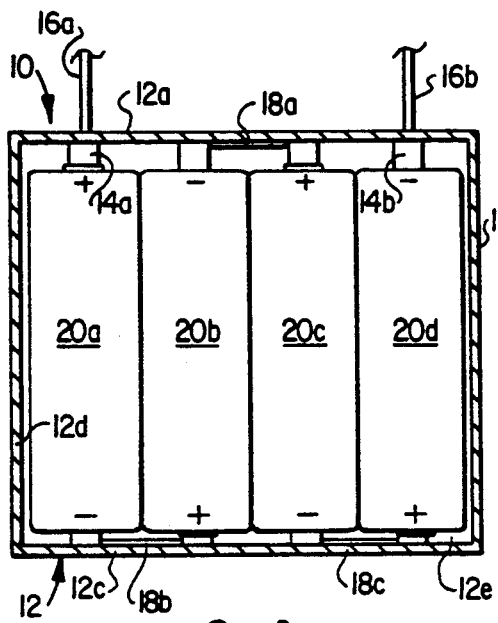
FIG. 1 is a sectional view depicting an energy storage device of the prior art.

A typical prior art system for supplying electrical power is shown in general by the reference numeral 10 in FIG. 1 of the drawing. The system includes a receptacle, or housing, 12 which is provided in the device to be powered (not shown) and which has four upright walls 12a-12d extending from a bottom plate 12e. Two single terminals 14a and 14b are formed on the inner surface of the wall 12a near the respective ends of the wall and are electrically connected in any conventional manner to two conductors 16a and 16b which extend through appropriate openings formed in the latter wall. The terminals 14a and 14b can be formed in any manner such as by bending an electrical conductive material, such as metal, to provide a spring action to receive a battery, as will be described.

A "double" terminal 18a is also provided on the inner surface of the wall 12a between the terminals 14a and 14b, and two double terminals 18b and 18c are provided on the inner surface of the wall 12c. Each double terminal 8a-18c contains two terminals similar to 14a and 14b which are connected together by the aforementioned metal material. The function of the double terminals 18a-18c will also be described later.

Four chargeable batteries 20a-20d are disposed in the receptacle 12 in a side-by-side relationship. The battery 20a extends between the terminal 14a and one terminal of the double terminal 18b, the battery 20b extends between the other terminal of the double terminal 18b and one terminal of the double terminal 18a, the battery 20c extends between the other terminal of the double terminal 18a and one terminal of the double terminal 18c, and the battery 20d extends between the other terminal of the double terminal 18c and the terminal 14b. Each of the batteries 20a-20d are of a conventional design and, as such, have positive and negative terminals formed at its respective ends. The negative terminals are formed by a flat metal plate forming an end of each battery while the positive terminals are in the form of a metal nipple o flange extending from the other end of each battery as will be described in detail later. For the convenience of presentation the positive and negative terminals are identified in FIG. 1 by a "+" and a "—", respectively, on the end portion of each battery.

The batteries 20a-20d are of a type, such as nickel cadmium, that can be charged by applying a DC current thereto, in a conventional manner. To this end, the respective terminals of the batteries 20a–20d are oriented so that a series circuit path can be established through the batteries and the terminals 14a, 14b and 18a–18c. For example, the terminal 14a can be in contact with the positive terminal of the battery 20a, the double terminal 18b can be in contact with the negative terminal of the battery 20a and the positive terminal of the battery 20b, the double terminal 18a can be in contact with the negative terminal of the battery 20b and the positive terminal of the battery 20c, the double terminal 18c can be in contact with the negative terminal of the battery 20c and the positive terminal of the battery 20d, and the terminal 14b can be in contact with the negative terminal of the battery 20b.

Thus, when the batteries 20a–20d are connected in an electrical circuit including a source of power, a charging current will flow through the batteries 20a–20d in the manner described above to charge the batteries. This charging circuit can be an external dedicated circuit in which the batteries 20a–20d would be placed. Alternatively, the charging circuit would include a portion of the circuit shown in FIG. 1 including the conductors 16a and 16b which would be connected to a power source to supply a charging current to the batteries 20a–20d. In either case, when charged, the batteries 20a–20d become a voltage source which causes current to flow through the circuit including the conductors 16a and 16b to power the device in which the receptacle is disposed.

Figure 2:
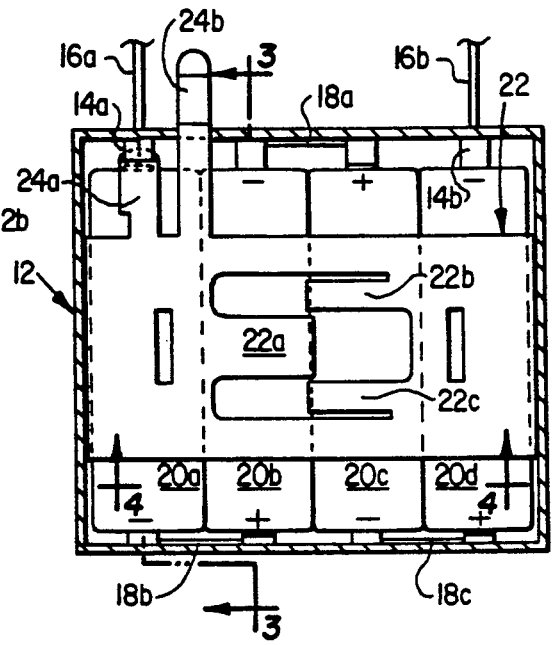
FIG. 2 is a view similar to FIG. 1, but depicting the energy storage device of the present invention.
Figure 3:
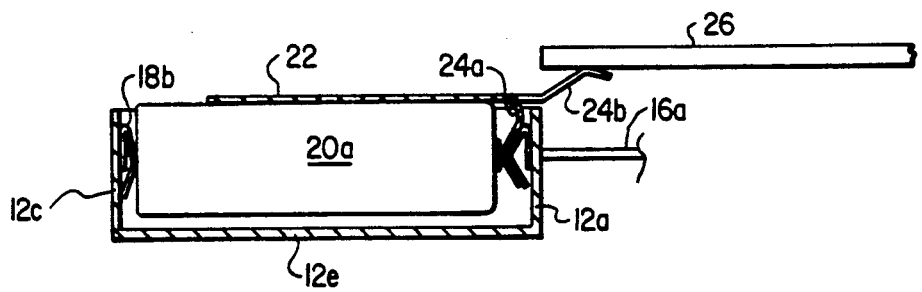
FIGS. 3 and 4 are cross-sectional views taken along the lines 3—3 and 4—4, respectively of FIG. 2, with the batteries being shown in elevation for the convenience of presentation.
Figure 4:
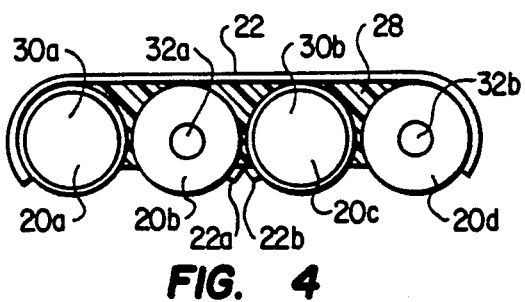

The system of the present invention is shown in FIGS. 2–4 and utilizes the batteries and the receptacle of FIG. 1 which are referred to by the same reference numerals and which are oriented in the same manner as described above. According to the present invention, a metal clip 22 extends over the batteries 20a–20d to secure them together in an abutting relationship to form a "battery pack". The clip 22 has one bent portion 22a and two bent portions 22b and 22c which are bent in a manner to extend around and engage corresponding curved portions of the batteries 20b–20c, to secure them in place. Also, the ends of the clip 22 are bent and curved to engage the corresponding surfaces of the batteries 20a and 20d respectively (FIG. 4).

Two spaced tabs 24a and 24b extend from the clip 22. Tab 24a is bent over to extend between the terminal 14a and the corresponding terminal of the battery 20a, and the tab 24b extends outwardly from the clip 22 and is bent in a manner to contact a terminal of an external power source (not shown) disposed in the device to be powered. The exact location of this power source can vary and, for example, could be located on a printed circuit board 26 or the like, located within the device to be powered and connected to an external power source. Thus, a charging current flow is established from the circuit 26 board through the tab 24b, the metal clip 22 and the tab 24a, and thus through the batteries 20a–20d and the terminal 14b as described above. In addition to being fastened together with the clip 22, the batteries 20a–20d are secured together and to the clip by an adhesive, glue, epoxy or the like, which is shown by the reference numeral 28 in FIG. 4. The negative terminals of the batteries 20a and 20c are shown by the reference numerals 30a and 30b, respectively, in FIG. 4 and the positive terminals of the batteries 20b and 20d are shown by the reference numerals 32a and 32b, respectively.

In operation, the chargeable batteries 20a–20d are placed in the clip 22 with the respective terminals, or poles, of the batteries oriented as shown in FIG. 2. Thus, when charged, the batteries 20a–20d act as a voltage source between the conductors 16a and 16b thus applying voltage and causing current flow through a load (not shown) connected to the latter conductors.

In a typical arrangement, the conductors 16a and 16b would be connected to a DC–DC converter to convert the output voltage from the batteries 20a–20d into a more stable fixed voltage. For example, if each battery was capable of storing 1.2 volts, the converter would have an output of approximately 4.8 volts. It should be noted that in this type of arrangement the charging current which is available, such as a household current through an AC-DC adapter, or the like, should exceed that of the combined output current of the batteries 20a–20d. For example, the design is such that the combined maximum current output from the batteries 20a–20d is approximately 50 milliamps of current, while the power source connected to the tab 24b would provide a current output in excess of this, such as 140 milliamps. Therefore, when the device to be powered is connected to an external source of power, a current of at least 90 milliamps would be available to charge the device even when it is in use.

Since the metal clip 22 has to be connected to the batteries 20a–20d for the device to accept a charge and since precautions can be taken not to connect an alkaline batteries to the clip, the user is assured that no alkaline batteries can be connected in the circuit in a manner to receive a charging current, thus insuring against damage to the circuit or to the user.

It is understood that several variations may be made in the foregoing without departing from the scope of the invention. For example, any number of batteries can be used within the scope of the invention in which case the metal clip 22 and the receptacle 12 would be configured accordingly. Also, the batteries do not necessarily have to be secured in a side-by-side relationship, but could be secured in an end-to-end relationship.

Other variations, modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An energy storage system comprising:
   a plurality of chargeable batteries, each having a positive terminal and a negative terminal disposed at its respective ends;
   means for connecting said batteries in a side-by-side relationship;
   a receptacle for receiving said batteries, said receptacle having terminals which are engaged by the respective terminals of said batteries in a manner to establish current flow through said batteries; and
   two conductors extending from corresponding terminals of said receptacle for supplying electrical energy from said batteries to an external circuit;
   said connecting means electrically connecting one of said batteries to a power source for conducting current from said power source to said batteries to charge said batteries.

2. An energy storage system comprising:
   a plurality of chargeable batteries, each having a positive terminal and a negative terminal disposed at its respective ends;

a metal clip extending over said batteries for connecting said batteries in a side-by-side relationship;

a tab extending from said metal clip and engaging one of the terminals of one of said batteries;

an additional tab extending from said metal clip and engaging a power source for conducting current from said power source to said batteries to charge said batteries; and a receptacle for receiving said batteries, said receptacle having terminals which are engaged by the respective terminals of said batteries in a manner to establish current flow through said batteries.

3. An electrical circuit comprising:

a source of electrical energy;

a load for receiving electrical energy;

a receptacle having terminal means;

energy storage means disposed in said receptacle and having terminals engaging said terminal means of said receptacle in a manner to conduct current from one of said terminal means of said receptacle through said energy storage means, and to another of said terminal means of said receptacle;

a clip electrically connected to said energy storage means and having a terminal extending to said source of electrical energy; and means electrically connecting said clip to said load to deliver electrical energy to said load.

4. An electrical circuit comprising:

a receptacle having terminal means;

energy storage means disposed in said receptacle and having terminals engaging said terminal means of said receptacle in a manner to conduct current from one of said terminal means of said receptacle through said energy storage means, and to another of said terminal means of said receptacle;

a clip mechanically connected to said energy storage means and having a first terminal extending to an external source of electrical power and a second terminal extending to said energy storage means, to provide a current flow path from said first terminal to said second terminal to electrically connect said energy storage means to said power source.

5. An energy storage system for use in a receptacle, said receptacle having terminals connected to conductor means for establishing an electric circuit, said system comprising:

battery means having terminals for engaging the conductor means of said receptacle to establish current flow from said conductor means, through said battery means and back to said conductor means; and means mechanically connected to said battery means and electrically connected between one of said terminals of said battery means and a current source externally of said receptacle for supplying a charging current to said battery means;

wherein said conductor means connects said battery means in said electric circuit for receiving power from said battery means.

6. The system of claim 5 wherein said means for supplying a charging current comprises a metal clip, a first tab extending from said metal clip to said power source, and a second tab extending from said metal clip to the terminal of said battery means to establish a current flow path from said first tab, through said clip and said second tab to said terminal of said battery means.

7. The system of claim 5 wherein said means for supplying a charging current comprises a metal clip, a first tab extending from said metal clip to said power source, and a second tab extending from said metal clip to the terminal of said battery means to establish a current flow path from said first tab, through said clip and said second tab to said terminal of said battery means.

8. A battery pack comprising:

a plurality of batteries;

means for conducting electrical current from a power source to said batteries to charge said batteries;

said means for conducting comprising:

a metal clip extending over said batteries for securing said batteries in an abutting relationship;

a tab extending from said metal clip and engaging said power source;

an additional tab extending from said metal clip and engaging the terminal of one of said batteries.

9. A battery pack comprising:

a plurality of batteries;

a metal clip, formed of an electrical conductive material, extending over said batteries for securing said batteries in an abutting relationship;

a tab extending from said metal clip and engaging a terminal of one of said batteries;

means extending from said metal clip for conducting electrical current from a power source to said metal clip; and means extending from said metal clip for conducting electrical current from said metal clip to said batteries so that charging current flow from said power source, through said metal clip and to said batteries to charge said batteries.

10. An energy storage system comprising:

a plurality of chargeable batteries;

means for connecting said batteries in a side-by-side relationship, each battery having a positive terminal and a negative terminal disposed at its respective ends;

a receptacle for receiving said batteries, said receptacle having terminal means which are engaged by the respective terminals of said batteries in a manner to establish current flow through said batteries; and conductor means extending from corresponding terminal means of said receptacle for conducting current from a power source located externally from said receptacle to said batteries for charging said batteries, and from said batteries to an external device requiring said current;

such that said batteries provide current to said external device, and are chargeable from said power source, without said batteries being removed from said receptacle.

* * * * *

UNITED STATES PATENT AND TRADEMARK OFFICE
CERTIFICATE OF CORRECTION

PATENT NO. : 5,200,687

DATED : APRIL 6, 1993

INVENTOR(S) : JONAS LINDBLOM and ERIK JOHNSSON

It is certified that error appears in the above-identified patent and that said Letters Patent is hereby corrected as shown below:

Column 2, line 42, change "8a" to --18a--.

Column 2, line 61, change "o" to --or--.

Column 6, line 36, change "flow" to --flows--.

Signed and Sealed this

Twenty-fifth Day of January, 1994

Attest:

BRUCE LEHMAN

Attesting Officer     Commissioner of Patents and Trademarks